United States Patent
Wang et al.

(10) Patent No.: US 8,819,118 B2
(45) Date of Patent: Aug. 26, 2014

(54) METHOD, SYSTEM AND SERVER FOR ISSUING DIRECTORY TREE DATA AND CLIENT

(75) Inventors: Xuxin Wang, Shenzhen (CN); Dong Wang, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 502 days.

(21) Appl. No.: 12/828,759

(22) Filed: Jul. 1, 2010

(65) Prior Publication Data

US 2010/0268774 A1    Oct. 21, 2010

Related U.S. Application Data

(63) Continuation of application No. PCT/CN2009/071913, filed on May 21, 2009.

(30) Foreign Application Priority Data

Jun. 19, 2008  (CN) .......................... 2008 1 0127135

(51) Int. Cl.
G06F 15/16      (2006.01)
G06F 17/30      (2006.01)
H04L 29/06      (2006.01)

(52) U.S. Cl.
CPC .......... *G06F 17/30961* (2013.01); *H04L 67/38* (2013.01)
USPC .............. 709/203; 709/219; 709/230; 463/41

(58) Field of Classification Search
USPC .............................. 709/203, 219, 230; 463/41
See application file for complete search history.

(56) References Cited

U.S. PATENT DOCUMENTS 5,864,854 A * 1/1999 Boyle ................................... 1/1
6,035,376 A * 3/2000 James .......................... 711/145

(Continued)

FOREIGN PATENT DOCUMENTS

| CN | 1786903 A | 6/2006 |
|----|-----------|--------|
| CN | 101188465 A | 5/2008 |
| CN | 101330510 A | 12/2008 |

OTHER PUBLICATIONS

Wu, Zhaoding; "Design and implementation of a server side in platform for chess/card online games"; Chinese Master's Theses Fulltext Database; Information Science and Technology; Jun. 15, 2007; No. 6; pp. 1139-1224; ISSN 1671-6779.

(Continued)

*Primary Examiner* — Thuong Nguyen
(74) *Attorney, Agent, or Firm* — Harness, Dickey & Pierce, P.L.C.

(57) ABSTRACT

A method, system, and server for issuing directory tree data and a client. The method includes: pre-storing Identities (IDs) for data blocks obtained by dividing directory tree data according to an agreed protocol, and generating and storing validity IDs for the data blocks according to the agreed protocol; receiving, by a directory tree server, an ID and a validity ID of a data block that the client requests to download, and querying for a validity ID of a data block having the same ID at a directory tree server side. If the validity ID of the data block having the same ID at the directory tree server side is the same as the validity ID received from the client, issuing a matching success message to the client; otherwise, issuing a matching failure message and the data block at the directory tree server side having the same ID to the client.

5 Claims, 5 Drawing Sheets

(56) References Cited

U.S. PATENT DOCUMENTS

| | | | |
|---|---|---|---|
| 6,615,204 | B1 | 9/2003 | Menon |
| 6,697,851 | B1* | 2/2004 | Althaus et al. ............... 709/220 |
| 7,454,668 | B1* | 11/2008 | Yochai et al. .................. 714/52 |
| 7,840,996 | B1* | 11/2010 | Wu ................................ 726/15 |
| 2001/0034822 | A1* | 10/2001 | Weinreb et al. .............. 711/203 |
| 2004/0002382 | A1 | 1/2004 | Ho et al. |
| 2005/0021660 | A1* | 1/2005 | San Andres et al. .......... 709/216 |
| 2006/0005017 | A1* | 1/2006 | Black et al. .................. 713/165 |
| 2006/0136513 | A1* | 6/2006 | Ngo et al. ..................... 707/203 |
| 2007/0033375 | A1* | 2/2007 | Sinclair et al. ............... 711/203 |
| 2007/0088838 | A1* | 4/2007 | Levkovitz et al. ............ 709/228 |
| 2007/0171903 | A1* | 7/2007 | Zeng et al. ................... 370/389 |
| 2007/0192406 | A1* | 8/2007 | Frietsch et al. ............... 709/203 |
| 2007/0226273 | A1* | 9/2007 | Rath et al. .................... 707/203 |
| 2009/0006635 | A1* | 1/2009 | Siegmund .................... 709/228 |
| 2009/0006792 | A1* | 1/2009 | Federwisch et al. .......... 711/162 |
| 2010/0124196 | A1* | 5/2010 | Bonar et al. .................. 370/329 |
| 2012/0203748 | A1* | 8/2012 | Kaminski, Jr. ............... 707/698 |

OTHER PUBLICATIONS

International Search Report for International Application No. PCT/CN2009/071913, dated Aug. 20, 2009, and English translation thereof.

Chinese Office Action for Chinese Patent Application No. 2008101271359, dated Aug. 31, 2010, and English translation thereof.

* cited by examiner

METHOD, SYSTEM AND SERVER FOR ISSUING DIRECTORY TREE DATA AND CLIENT

CROSS-REFERENCE TO RELATED APPLICATIONS

This application is a continuation of International Application No. PCT/CN2009/071913, filed May 21, 2009. This application claims the benefit and priority of Chinese Application No. 200810127135.9, filed Jun. 19, 2008. The entire disclosures of each of the above applications are incorporated herein by reference.

FIELD

The present disclosure relates to data downloading techniques, and more particularly, to a method, system and server for issuing directory tree data and a client.

BACKGROUND

This section provides background information related to the present disclosure which is not necessarily prior art.

Data organized in a directory tree structure is a typical kind of hierarchy data which includes at least two data blocks. The data blocks are in a hierarchy relation between each other, a portal to a lower-hierarchy data block is located within a higher-hierarchy data block. Therefore, in order to open the lower-hierarchy data block, it is required to open the higher-hierarchy data block first. Hereinafter, the data organized in the directory tree structure is called directory tree data for short.

In the field of multi-party online games, a game platform is usually organized in the directory tree structure. Before joining in an online game, a player needs to download the directory tree data from a directory tree server through a client and update directory tree data locally stored with the directory tree data downloaded. After the client successfully downloads the directory tree data, the player opens a node on the directory tree and thus can enter into a corresponding room in the game platform for playing. However, if the client fails to download the directory tree data, the player cannot join in the game.

FIG. 1 is a flowchart illustrating a method for downloading directory tree data from the directory tree server by the client in the prior art. As shown in FIG. 1, the method specifically includes the following steps.

Step 101: A client logs on a directory tree server. If the logon succeeds, proceed to step 102; otherwise, the client fails to download the directory tree data.

In this step, if the client fails to download the directory tree data, the player cannot join in a game even if the client has stored the directory tree data locally.

Step 102: The client transmits a directory tree data download request or a directory tree data update request to the directory tree server.

Data blocks stored locally at the client cannot be used before being updated. Therefore, data blocks requested to be downloaded in this step includes both locally-stored data blocks and new data blocks. The data blocks requested to be downloaded in this step may also include only the locally-stored data blocks without the new data blocks.

Step 103: The directory tree server issues all the directory tree data requested to the client.

Step 104: The client receives all the directory tree data issued by the directory tree server and updates the locally-stored directory tree data.

As can be seen from the above, in the prior art, the directory tree server issues all the directory tree data which the client requests to download, while the data which the client requests to download may include the locally-store data of the client. If the locally-stored data is the same as corresponding data from a directory tree server side, the method for issuing data wastes downlink resources of the directory tree server.

SUMMARY

This section provides a general summary of the disclosure, and is not a comprehensive disclosure of its full scope or all of its features.

In view of the above, embodiments of the present invention provide a method, system and server for issuing directory tree data and a client, which can save downlink resources of a directory tree server.

The technical scheme of the embodiments of the present invention are implemented as follows.

According to an embodiment, a method for issuing directory tree data includes:

pre-storing, by a directory tree server and a client, Identities (IDs) of data blocks obtained by dividing directory tree data according to an agreed protocol, and generating validity IDs for the data blocks according to the agreed protocol;

receiving, by the directory tree server, an ID and a validity ID of a data block that the client requests to download, and querying for a validity ID of a data block having the same ID at a directory tree server side; if the validity ID of the data block having the same ID at the directory tree server side is the same as the validity ID received from the client, issuing, by the directory tree server, a matching success message to the client; otherwise, issuing, by the directory tree server, a matching failure message and the data block at the directory tree server side having the same ID to the client.

According to another embodiment, a method for issuing directory tree data includes:

pre-storing, by a directory tree server, Identities (IDs) of data blocks obtained by dividing directory tree data according to an agreed protocol, generating and storing validity IDs of the data blocks according to the agreed protocol;

generating, by a client, an ID and a validity ID of a data block requested to be downloaded according to the agreed protocol, and transmitting the ID and the validity ID to the directory tree server;

receiving, by the directory tree server, the ID and the validity ID transmitted by the client, and querying for a validity ID of a data block having the same ID at a directory tree server side; if the validity ID of the data block having the same ID at the directory tree server side is the same as the validity ID transmitted by the client, issuing, by the directory tree server, a matching success message to the client; otherwise, issuing, by the directory tree server, a matching failure message and the data block having the same ID at the directory tree server side to the client.

According to yet another embodiment, a system for issuing directory tree data includes: a directory tree server and a client; wherein the directory tree server is adapted to pre-store Identities (IDs) of data blocks obtained by dividing directory tree data according to an agreed protocol between the directory tree server and the client, generate validity IDs for the data blocks at a directory tree server side according to the agreed protocol, receive an ID and a validity ID of a data block that the client requests to download, query for a validity ID of a data block having the same ID at the directory tree server side, issue a matching success message to the client if the validity ID at the directory tree server is the same as the validity ID received from the client, and issue a matching failure message and the data block having the same ID at the directory tree server side to the client if the validity ID at the directory tree server is different from the validity ID received from the client; and the client is adapted to pre-store or generate the ID and the validity ID of the data block requested to be downloaded according to the agreed protocol between the client and the directory tree server, and transmit the ID and the validity ID of the data block to the directory tree server, receive the matching success message, or the matching failure message and the data block having the same ID at the directory tree server side.

According to yet another embodiment, a server includes: an Identity (ID) generating unit, a matching unit and an issuing unit; wherein the ID generating unit is adapted to generate IDs and validity IDs for data blocks at a server side according to an agreed protocol between the server and a client, and store the IDs and validity IDs;

the matching unit is adapted to receive an ID and a validity ID of a local data block of the client, query for a validity ID of a data block having the same ID at the server side, issue a matching success indication to the issuing unit if the validity ID of the data block having the same ID at the server side is the same as the validity ID received from the client, and issue a matching failure indication to the issuing unit if the validity ID of the data block having the same ID at the server side is different from the validity ID received from the client; and the issuing unit is adapted to issue a matching success message after receiving the matching success indication, and issue a matching failure message and the data block having the same ID at the server side after receiving matching failure indication.

According to yet another embodiment, a client includes: an Identity (ID) generating unit, a transmitting unit, an updating unit and a local data storing unit; wherein the ID generating unit is adapted to generate and store an ID and a validity ID of a data block requested to be downloaded according to an agreed protocol between the client and a directory tree server;

the transmitting unit is adapted to transmit the ID and the validity ID of the data block requested to be downloaded to the directory tree server;

the updating unit is adapted to keep a local data block having the ID unchanged after receiving a matching success message, updates the local data block having the ID with a data block having the same ID at a directory tree server side after receiving a matching failure message and the data block having the same ID at the directory tree server side; and the local data storing unit is adapted to store the local data block of the client.

As can be seen from the above, in embodiments of the present invention, the directory tree server and the client generate IDs and validity IDs for data blocks according to an agreed protocol. The directory tree server receives an ID and a validity ID of a data block that the client requests to download. Only when a validity ID of a data block at the directory tree server side having the same ID as the data block that the client requests to download is different from the validity ID of the data block that the client requests to download, the directory tree server issues the data block at the directory tree server side, whereas does not issue the data block at the directory tree server side if the validity IDs are the same. Thus, the downlink resources of the directory tree server are saved.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
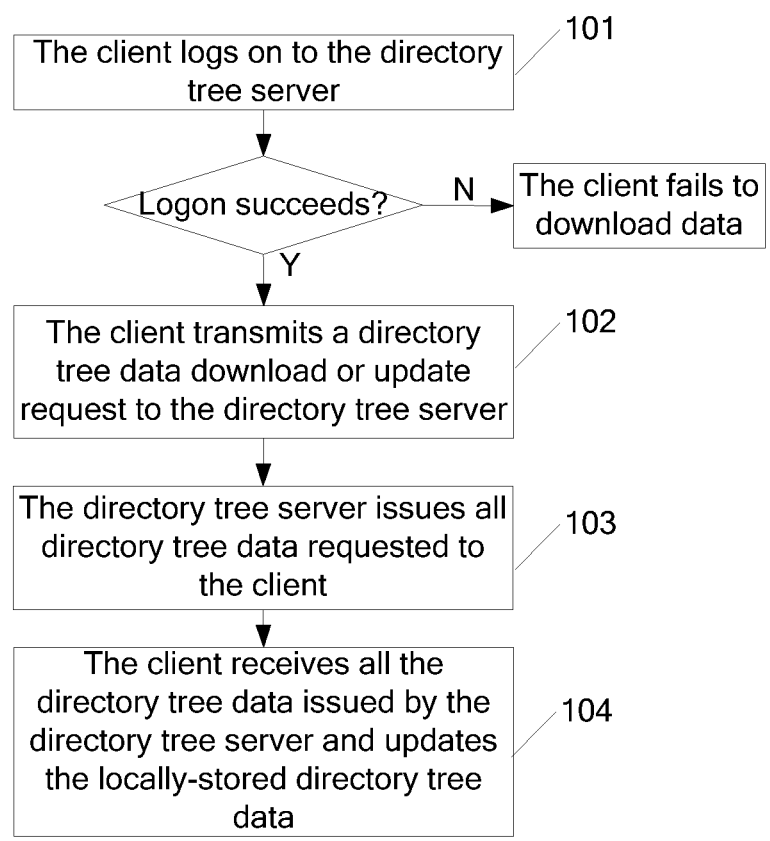
FIG. 1 is a flowchart illustrating a method for downloading directory tree data from a directory tree server by a client according to the prior art.

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

In an embodiment of the present invention, a directory tree server and a client respectively generate Identities (IDs) and validity IDs for data blocks according to an agreed protocol. The directory tree server receives an ID and a validity ID of a data block that the client requests to download. Only when a validity ID of a data block at the directory tree server side having the same ID as the data block that the client requests to download is different from the validity ID of the data block that the client requests to download, the directory tree server issues the data block at the directory tree server having the same ID as the data block that the client requests to download, whereas does not issue the data block at the directory tree server side having the same validity ID as the data block that the client requests to download. Herein, the data block that the client requests to download may include both a locally-stored data block of the client and a new data block which is not stored at the client, or may include only the locally-stored data block of the client or only the new data block which is not stored at the client. If the validity ID of the data block at the directory tree server having the same ID as the data block that the client requests to download is the same as the validity ID of the data block that the client requests to download, it indicates that the data block that the client requests to download has already been stored locally at the client and is the same as corresponding data block at the directory tree server side. Thus, it is unnecessary for the directory tree server to issue the data block, and therefore the downlink resources of the directory tree server are saved.

To make the technical scheme and merits of the present invention clearer, the present invention will be described hereinafter in detail with reference to accompanying drawings and embodiments.

According to an embodiment, a directory tree downloading protocol is customized first. Then, the directory tree data are divided into data blocks according to the directory tree downloading protocol, and IDs are generated for the data blocks. Both the directory tree server and the client store the IDs of the data blocks and generate a validity ID for each data block according to the directory tree downloading protocol. The client assembles downloaded data blocks according to the directory tree downloading protocol and the IDs of the data blocks.

Figure 2:
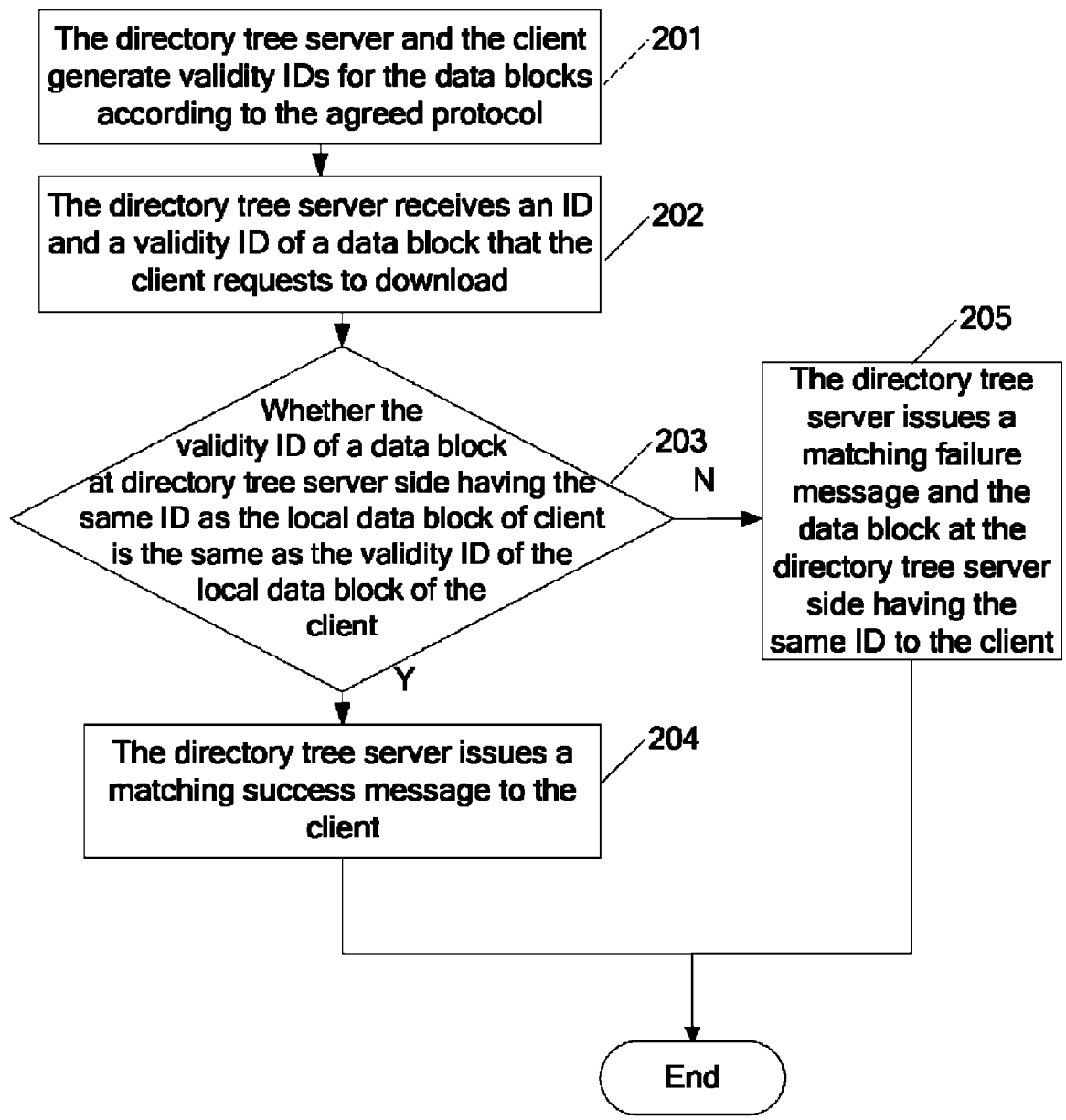
FIG. 2 is a flowchart illustrating a method for issuing directory tree data by the directory tree server according to an embodiment of the present invention.

FIG. 2 is a flowchart illustrating a method for issuing directory tree data by the directory tree server according to an embodiment of the present invention. As shown in FIG. 2, the method includes:

Step 201: The directory tree server and the client generate a validity ID for each data block according to the agreed protocol.

Both the directory tree server and the client store the IDs of the data blocks in advance. Or alternatively, the directory tree server stores the IDs of the data blocks in advance, and the client generates IDs and validity IDs of data blocks that the client requests to download according to the agreed protocol. Herein, the IDs are generated according to the agreed protocol for the data blocks obtained by dividing the directory tree data according to the directory tree downloading protocol.

In this step, both the directory tree server and the client generate the IDs and validity IDs for their respective data blocks according to the agreed protocol.

Herein, the validity ID of a data block may be a version number, or a Hash value obtained by performing calculation on data of the data block according to a Hash algorithm, e.g. a MD5 algorithm.

Because the Hash algorithm generates a byte sequence relying completely on target data contents according to the target data contents, the same byte sequence will be generated for the data with the same contents according to the Hash algorithm and different byte sequences will be generated for the data with different contents according to the Hash algorithm. Therefore, when the Hash value is taken as the validity ID of the data block, it can prevent the local data from being counterfeited and thus can ensure that the local data is consistent with the data at the directory tree server side.

Step 202: The directory tree server receives the IDs and validity IDs of the data blocks that the client requests to download.

In this step, if some or all of the IDs received by the directory tree server have no corresponding validity IDs, it indicates that data blocks corresponding to the IDs which have no corresponding validity IDs do not exist at the client and are new data blocks that the client requests to download. Therefore, the directory tree server issues the data blocks corresponding to the IDs which have no corresponding validity IDs to the client.

Step 203: The directory tree server determines whether a validity ID of a data block at the directory tree server side having the same ID as a local data block of the client is the same as validity ID of the local data block of the client; if the validity IDs are the same, proceed to Step 204; otherwise, proceed to Step 205.

Step 204: The directory tree server issues a matching success message to the client. And the procedure is terminated.

In this step, the matching success message contains an ID of matched data block.

Step 205: The directory tree server issues a matching failure message and issues the data block at the directory tree server side having the ID to the client. And the procedure is terminated.

In this step, the matching failure message contains an ID of the unmatched data block.

In the method shown in FIG. 2, only when the validity ID of the data block at the directory tree server side having the same ID as the data block that the client requests to download is different from the validity ID of the data block that the client requests to download, the directory tree server issues the data block at the directory tree server side having the ID, whereas when the validity ID of the data block at the directory tree server side is the same as that of the data block that the client requests to download, the directory tree server does not issue the data block. Therefore, the downlink resources of the directory tree server are saved.

Figure 3:
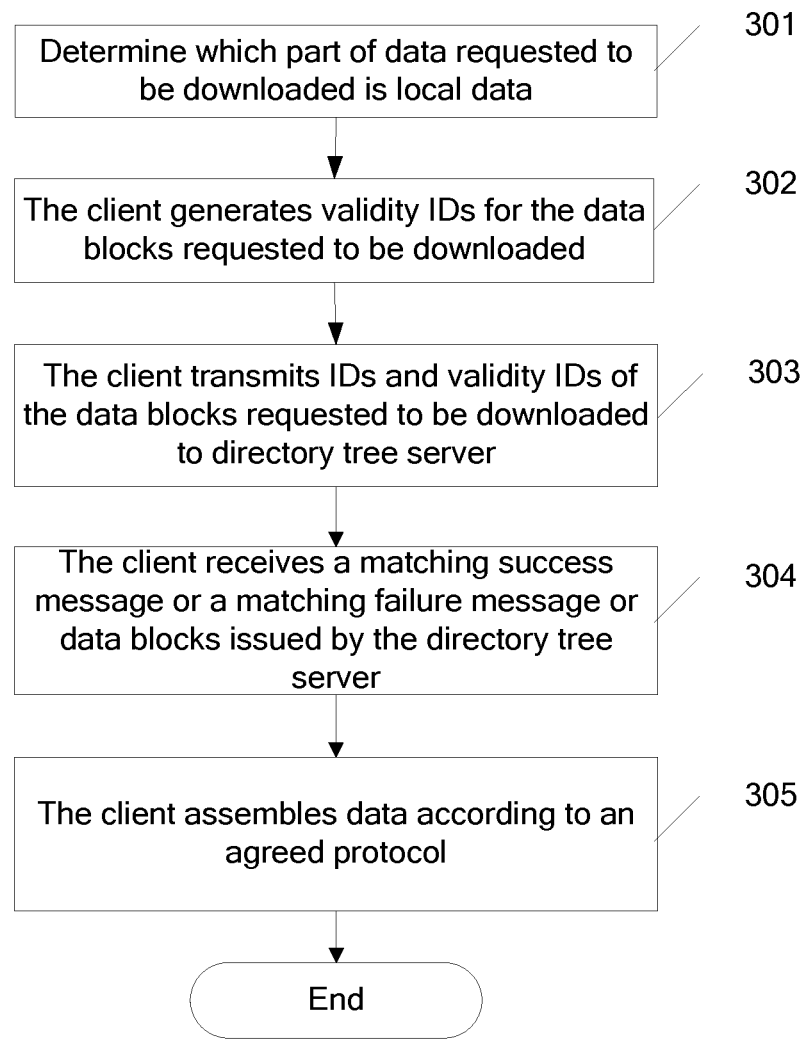
FIG. 3 is a flowchart illustrating a method for downloading directory tree data by the client according to an embodiment of the present invention.

FIG. 3 is a flowchart illustrating a method for downloading directory tree data by the client according to an embodiment of the present invention. As shown in FIG. 3, the method includes:

Step 301: It is determined which part of data requested to be downloaded is local data.

In this step, the client traverses IDs of the data blocks requested to be downloaded and IDs of the local data blocks, and determines which part of the data requested to be downloaded are the local data through comparing the IDs of the data blocks requested to be downloaded with the IDs of the local data blocks. The local data determined are local data to be updated. Specifically, the local data blocks with the same IDs as the data blocks requested to be downloaded are taken as local data to be updated.

Step 302: The client generates validity IDs for the data blocks requested to be downloaded.

In this step, the method for generating the validity IDs for the local data blocks to be updated is the same as the method for generating the validity IDs for the data blocks at the directory tree server side. The validity ID of a local data block to be updated may be a version number, or a Hash value obtained by performing calculation on data of the data block according to a Hash algorithm.

Besides the local data blocks to be updated, the data requested to be downloaded may also include new data blocks requested to be downloaded.

The value of the validity ID of a new data block requested to be downloaded is an invalid value determined by both the client and the server. If the server detects that the value of the validity ID is the invalid value, the directory tree server issues a data block at the directory tree server side having an ID corresponding to the validity ID.

Step 303: The client transmits the IDs and the validity IDs of the data blocks requested to be downloaded to the directory tree server.

Step 304: The client receives a matching success message, and/or a matching failure message and data blocks issued by the directory tree server.

In this step, the matching success message contains the IDs of matched data blocks, the matching failure message contains the IDs of unmatched data blocks, and the data blocks issued by the directory tree server have corresponding IDs.

Step 305: The client assembles the data blocks according to an agreed protocol between the client and the directory tree server. The procedure is terminated.

In this step, the client keeps local data blocks having the IDs contained in the matching success message unchanged, updates local data blocks having the IDs contained in the matching failure message with the data blocks at the directory tree server side having the IDs contained in the matching failure message, and assembles the data blocks according to the agreed protocol between the client and the directory tree server and the IDs of the data blocks.

In the method shown in FIG. 3, if the validity ID of a local data block that the client requests updating is the same as the validity ID of the corresponding data block at the directory tree server side, the local data blocks having the validity ID can be reused without being updated. If the client fails to log on the directory tree server, or waits for a response from the directory tree server over a pre-defined time interval, the client assembles local data according to the agreed protocol between the client and the directory tree server and the ID of the local data block, and logs on a game platform server using the assembled local data.

Figure 4:
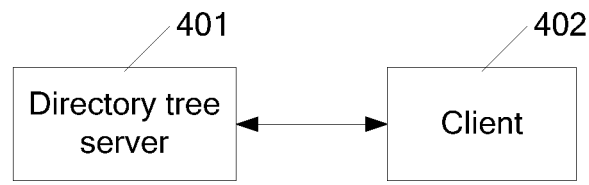
FIG. 4 is a schematic diagram illustrating a structure of a system for issuing directory tree data according to an embodiment of the present invention.

FIG. 4 is a schematic diagram illustrating a structure of a system for issuing directory tree data according to an embodiment of the present invention. As shown in FIG. 4, the system includes a directory tree server 401 and a client 402.

The directory tree server 401 is adapted to pre-store IDs of data blocks obtained by dividing directory tree data according to an agreed protocol between the directory tree server 401 and the client 402, generate validity IDs for the data blocks at the directory tree server side according to the agreed protocol, receive an ID and a validity ID of a data block that the client 402 requests to download, query for a validity ID of a data block at the directory tree server 401 having the received ID, issue a matching success message to the client 402 if the validity ID at the directory tree server 401 is the same as the validity ID from the client 402, and issue a matching failure message and the data block at the directory tree server 401 having the received ID to the client 402 if the validity ID at the directory tree server 401 is different from the validity ID from the client 402.

The client 402 is adapted to pre-store or generate the ID and the validity ID for the data block requested to be downloaded according to the agreed protocol, and transmit the ID and validity ID of the data block to the directory tree server 401, receive the matching success message, or the matching failure message and the data block at the directory tree server 401 having the transmitted ID.

Figure 5:
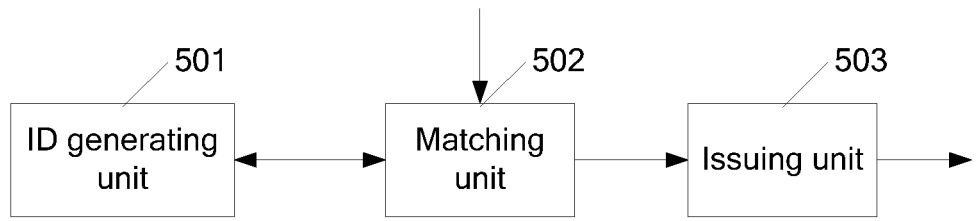
FIG. 5 is a schematic diagram illustrating a structure of a directory tree server according to an embodiment of the present invention.

FIG. 5 is a schematic diagram illustrating a structure of a directory tree server according to an embodiment of the present invention. As shown in FIG. 5, the directory tree server includes: an ID generating unit 501, a matching unit 502 and an issuing unit 503.

The ID generating unit 501 is adapted to generate and store IDs and validity IDs for data blocks at the directory tree server side according to a protocol agreed between the directory tree server and the client.

The matching unit 502 is adapted to receive an ID and a validity ID of a data block that the client requests to download, query for a validity ID of a data block at the directory tree server side having the received ID, issue a matching success indication to the issuing unit 503 if the validity ID at the directory tree server side is the same as the validity ID from the client, and issue a matching failure indication to the issuing unit 503 if the validity ID at the directory tree server side is different from the validity ID from the client.

The issuing unit 503 is adapted to issue a matching success message after receiving the matching success indication, and issue a matching failure message as well as the data block having the received ID at the directory tree server side after receiving the matching failure indication.

Figure 6:
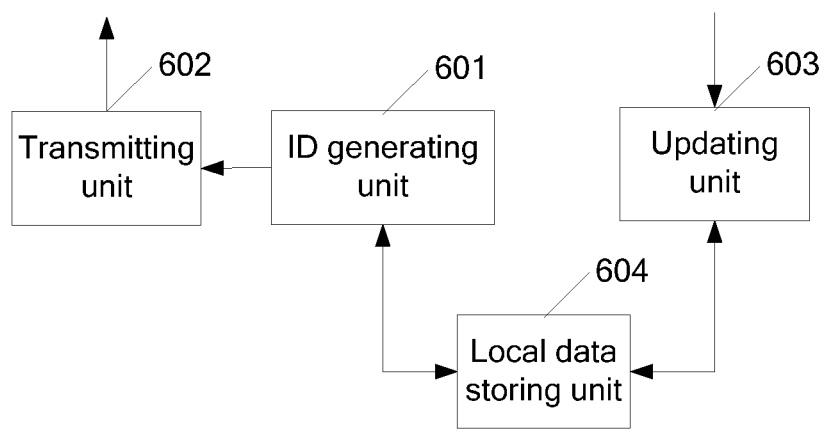
FIG. 6 is schematic diagram illustrating a first structure of a client according to an embodiment of the present invention.

FIG. 6 is schematic diagram illustrating a first structure of a client according to an embodiment of the present invention. As shown in FIG. 6, the client includes an ID generating unit 601, a transmitting unit 602, an updating unit 603 and a local data storing unit 604.

The ID generating unit 601 is adapted to generate and store an ID and a validity ID for a data block requested to be downloaded according to an agreed protocol between the client and the directory tree server.

The transmitting unit 602 is adapted to transmit the ID and validity ID of data block requested to be downloaded to the directory tree server.

The updating unit 603 is adapted to keep a local data block having the ID unchanged after receiving a matching success message, and update local data block having the ID with the data block having the ID at the directory tree server side after receiving a matching failure message and the data block having the ID at the directory tree server side.

The local data storing unit 604 is adapted to store the local data block of the client.

The local data storing 604 may be further adapted to store the ID and the validity ID of the local data block.

Figure 7:
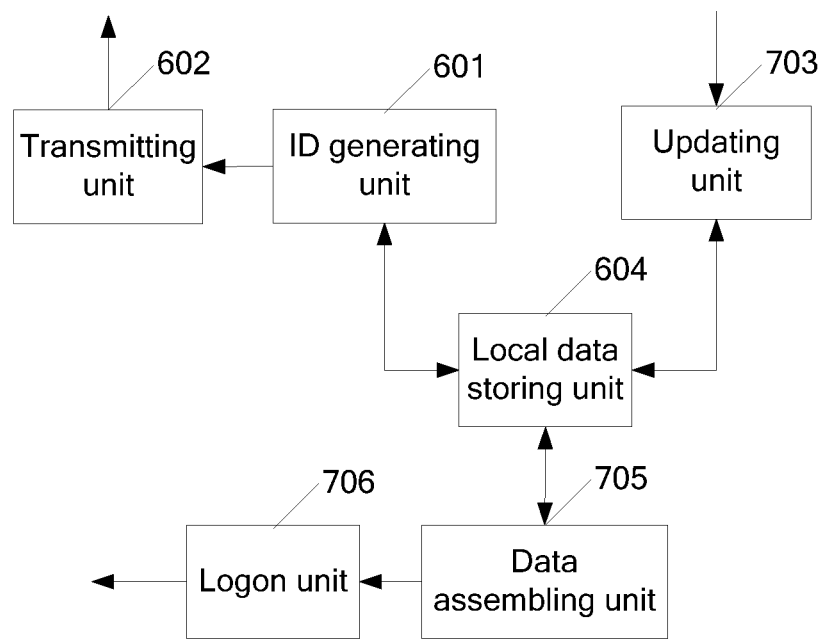
FIG. 7 is schematic diagram illustrating a second structure of a client according to an embodiment of the present invention.

FIG. 7 is a schematic diagram illustrating a second structure of a client according to an embodiment of the present invention. As shown in FIG. 7, the client includes an ID generating unit 601, a transmitting unit 602, an updating unit 603 and a local data storing unit 604, a data assembling unit 705 and a logon unit 706.

The ID generating unit 601, the transmitting unit 602, the updating unit 603 and the local data storing unit 604 in FIG. 7 have same structures as those shown in FIG. 6.

Based on the updating unit 603 in FIG. 6, the updating unit 703 in FIG. 7 may be further adapted to transmit an assembling indication to the data assembling unit 705 after finishing updating the local data.

The data assembling unit 705 is adapted to assemble data according to the agreed protocol between the directory tree server and the client after receiving the assembling indication of the updating unit 703.

Based on the updating unit 603 in FIG. 6, the updating unit 703 may be further adapted to transmit the assembling indication to the data assembling unit 705 after waiting for a response of the directory tree server over a pre-defined time interval.

The data assembling unit 705 is further adapted to transmit a logon indication to the logon unit 706 after finishing assembling the local data.

The logon unit 706 is adapted to log on a game platform server after receiving the logon indication.

As can be seen from the above technical scheme, the directory tree server and the client generate the IDs and validity IDs for data blocks according to an agreed protocol, the directory tree server receives an ID and a validity ID of a data block that the client requests to download. Only when a validity ID of the data blocks at the directory tree server side having the same ID as the data block that the client requests to download is different from the validity ID of the data block that the client requests to download, the directory tree server issues the data block at the directory tree server side having the ID, whereas does not issue the data block at the directory tree server side that has the same validity ID as the data block that the client requests to download. Therefore, the downlink resources of the directory tree server are saved.

When the directory tree server and the client performs calculation on data blocks according to a Hash algorithm to obtain Hash values and take the Hash values as the validity IDs of the data blocks, because different Hash values will be obtained after the Hash calculation on different data blocks, it may prevent the local data from being counterfeited and ensure that the local data of the client is consistent with the data at the directory tree server side.

Because the local data at the client can be reused, even if the client fails to log on the directory tree server, the client can still log on the game platform server.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for issuing directory tree data, comprising:
   transmitting, by a client device, an Identity (ID), and a validity ID of a data block stored in the client device to a directory tree server device; wherein the data block stored in the client device is to be updated, and the validity ID of the data block is a hash value of the data block, such that the directory tree server device finds a data block which is stored in the director tree server device and has an ID identical with the ID transmitted by the client device, and determines whether the validity ID transmitted by the client device is the same as a validity ID of the data block stored in the directory tree server device;
   in response to receiving a matching success message which is issued by the directory tree server device if the validity ID transmitted by the client device is the same as the validity ID of the data block stored in the directory tree server device, keeping, by the client device, the data block to be updated in the client device unchanged, assembling the data block in the client device and other data blocks in the client device to obtain assembled data, and logging on a game platform server using the assembled data;
   in response to receiving a matching failure message and the data block stored in the directory tree server device which are issued by the directory tree server device if the validity ID transmitted by the client device is different from the validity ID of the data block stored in the director tree server device, updating, by the client device, the data block to be updated in the client device with the data block received from the directory tree server device, assembling the updated data block with other data blocks in the client device to obtain assembled data, and logging on a game platform server using the assembled data; and
   if the client device does not receive the matching success message or the matching failure message from the directory tree server device within a pre-defined time period, assembling, by the client device, the data block to be updated in the client device with other data blocks in the client device to obtain assembled data and logging on the game platform server using the assembled data.

2. The method of claim 1, wherein if the validity ID transmitted by the client device is an invalid value, finding, by the directory tree server device, the data block which is stored in the directory tree server device and has the ID identical with the ID transmitted by the client device, and issuing, by the directory tree server device, the data block stored in the directory tree server device to the client device.

3. A system for issuing directory tree data, comprising: a directory tree server device and a client device; wherein
   the directory tree server device (i) receives an Identity (ID), and a validity ID of a data block stored in the client device from the client device, wherein the data block stored in the client device is to be updated, and the validity ID of the data block is a hash value of the data block, (ii) finds a data block which is stored in the director tree server device and has an ID identical with the ID received from the client device; (iii) determines whether the validity ID received from the client device is the same as a validity ID of the data block stored in the directory tree server device; (iv) issues a matching success message to the client device if the validity ID of the data block stored in the directory tree server device is the same as the validity ID received from the client device, and issues a matching failure message and the data block stored in the directory tree server device to the client device if the validity ID of the data block stored in the directory tree server device is different from the validity ID received from the client device; and
   the client device (i) transmits the ID and the validity ID of the data block stored in the client device to the directory tree server device, (ii) in response to receiving the matching success message, keeps the data block in the client device unchanged, assembles the data block in the client device with other data blocks in the client device to obtain assembled data and logs on a game platform server using the assembled data; (iii) in response to receiving the matching failure message and the data block stored in the directory tree server device, updates the data block to be updated in the client device with the data block received from the director tree server device, assembles the updated data block with other data blocks in the client device to obtain assembled data, and logs on the game platform server using the assembled data; and (iv) if the client device does not receive the matching success message or the matching failure message from the director tree server device within a pre-defined time period, the client device assembles the data block to be updated in the client device with other data blocks in the client device to obtain assembled data and logs on the game platform server using the assembled data.

4. The system of claim 3, wherein the directory tree server device is further adapted to find, if the validity ID transmitted by the client device is an invalid value, the data block which is stored in the directory tree server device and has the ID identical with the ID transmitted by the client device, and issue the data block stored in the directory tree server device to the client device.

5. A client device, comprising: an ID generating unit, a transmitting unit, an updating unit, a local data storing unit, a data assembling unit and a logon unit;
wherein
- the ID generating unit is adapted to generate an Identity (ID) and a validity ID for a data block stored in local data storing unit, wherein the data block stored in the local data storing unit is to be updated, and the validity ID is a hash value of the data block;
- the transmitting unit is adapted to transmit the ID and the validity ID of the data block to a directory tree server device, such that the directory tree server device finds a data block which is stored in the directory tree server device and has an ID identical with the ID transmitted by the transmitting unit, and determines whether the validity ID transmitted by the transmitting unit is the same as a validity ID of the data block stored in the directory tree server device;
- the updating unit is adapted to (i) keep the data block stored in the local data storing unit unchanged in response to receiving a matching success message which is issued by the directory tree server device if the validity ID transmitted by the client device is the same as the validity ID of the data block stored in the directory tree server device, and transmit an assembling indication to the data assembling unit, (ii) in response to receiving a matching failure message and the data block stored in the directory tree server device which are issued by the directory tree server device if the validity ID transmitted by the client device is different from the validity ID of the data block stored in the directory tree server device, update the data block in the local data storing unit with the data block received from the directory tree server device, and transmit an assembling indication to the data assembling unit after the data block to be updated in the client device is updated; and (iii) in response to not receiving the matching success message or the matching failure message from the directory tree server device within a pre-defined time period, transmit an assembling indication to the data assembling unit;
- the local data storing unit is adapted to store the data block to be updated and other data blocks of the client device;
- the data assembling unit is adapted to assemble the data block with the other blocks in the local data storing unit to obtain assembled data, and transmit a logon indication to the logon unit; and
- the logon unit is adapted to log on a game platform server using the assembled data obtained by the data assembling unit after receiving the logon indication.

* * * * *